(12) United States Patent
Tsai et al.

(10) Patent No.: US 8,804,351 B2
(45) Date of Patent: Aug. 12, 2014

(54) ELECTRONIC DEVICE

(75) Inventors: Tung-Chun Tsai, New Taipei (TW);
Yen-Chi Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 36 days.

(21) Appl. No.: 13/204,856

(22) Filed: Aug. 8, 2011

(65) Prior Publication Data

US 2012/0162942 A1    Jun. 28, 2012

(30) Foreign Application Priority Data

Dec. 24, 2010  (TW) .............................. 99145960 A

(51) Int. Cl.
*H05K 5/00*  (2006.01)
(52) U.S. Cl.
USPC ........................... 361/752; 361/727; 439/259

(58) Field of Classification Search
USPC .................................. 361/752, 727; 439/259
See application file for complete search history.

(56) References Cited

U.S. PATENT DOCUMENTS 7,479,029 B2 *  1/2009  Cook et al. .................... 439/517
7,654,844 B1 *  2/2010  Wormsbecher et al. ...... 439/259

* cited by examiner

*Primary Examiner* — Andargie M Aychillhum
(74) *Attorney, Agent, or Firm* — Novak Druce Connolly Bove + Quigg LLP

(57) ABSTRACT

The chassis of an electronic device includes a circuit board and a power supply, a base, and a first side plate. An accommodating space, with an opening thereinto, is defined in the base. The circuit board is attached to the base, and a first connector is attached to a back surface of the circuit board. A second connector is attached to the power supply and electronically connected to the first connector. The power supply may be slid into the accommodating space via the opening. The sliding direction of the power supply as it is inserted is substantially parallel to the circuit board, and the first side plate is attached to the base to cover the opening.

11 Claims, 6 Drawing Sheets

ELECTRONIC DEVICE

BACKGROUND

1. Technical Field

The present disclosure relates to electronic devices, more particularly to a mobile internet device.

2. Description of Related Art

A mobile internet device, such as a tablet computer, or a Personal Digital Assistant, has a power supply that cannot be detached or is difficult to detach from an enclosure of the mobile device. Removal of the power supply becomes time-consuming and inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
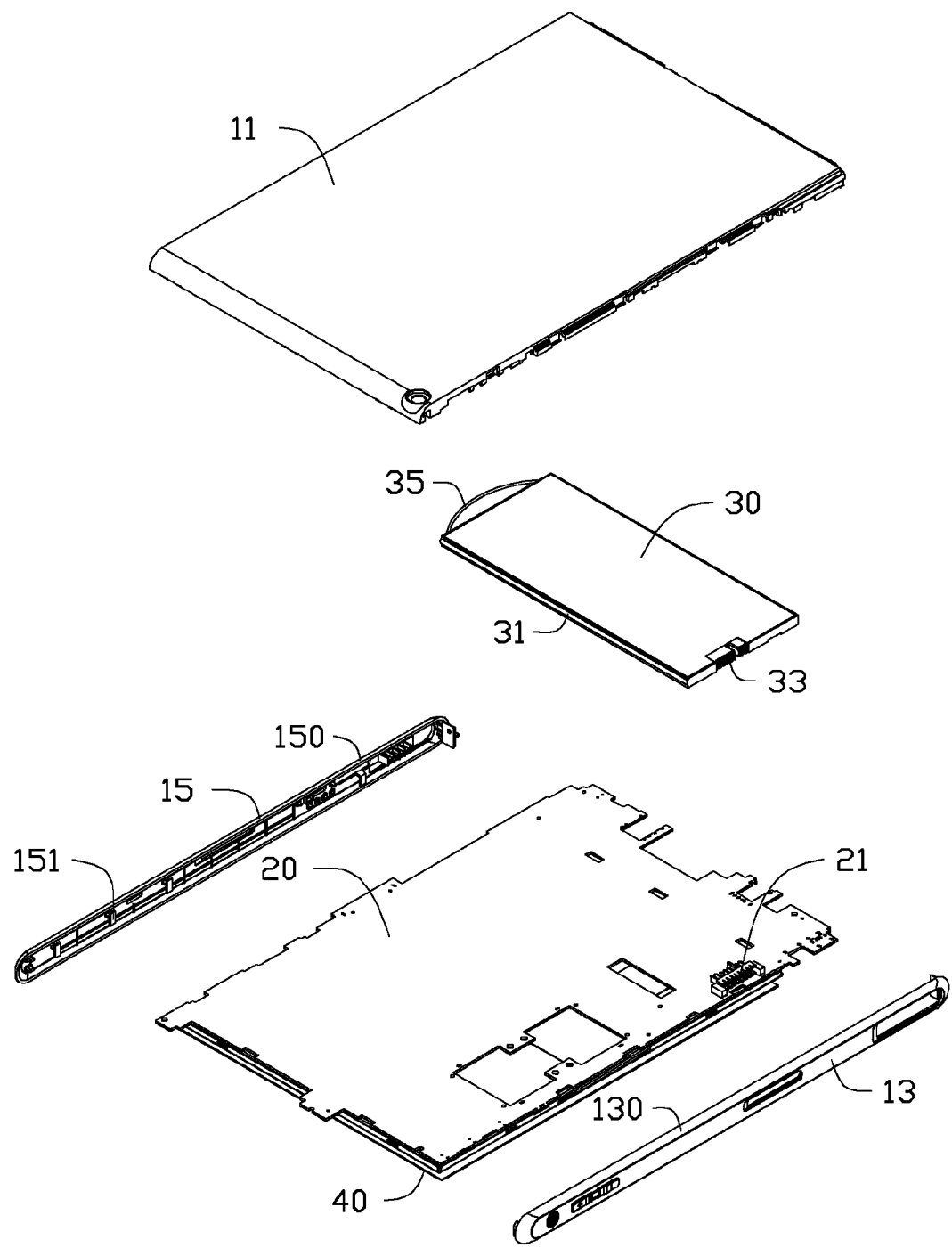
FIG. 1 is an exploded, isometric view of one embodiment of an electronic device.
Figure 2:
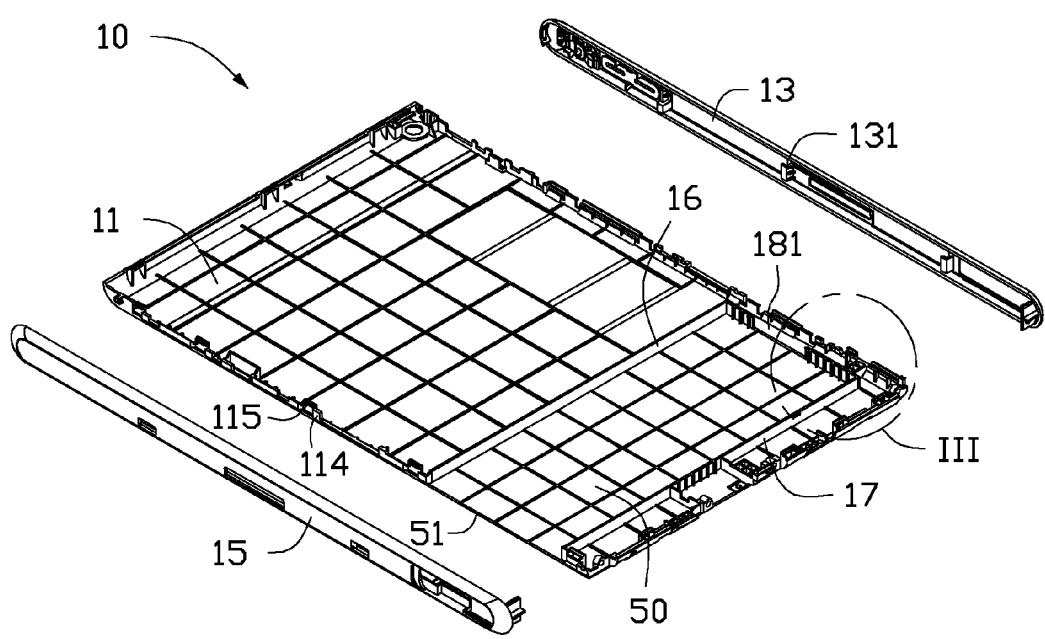
FIG. 2 is a partially exploded, isometric view of the electronic device of FIG. 1.
Figure 3:
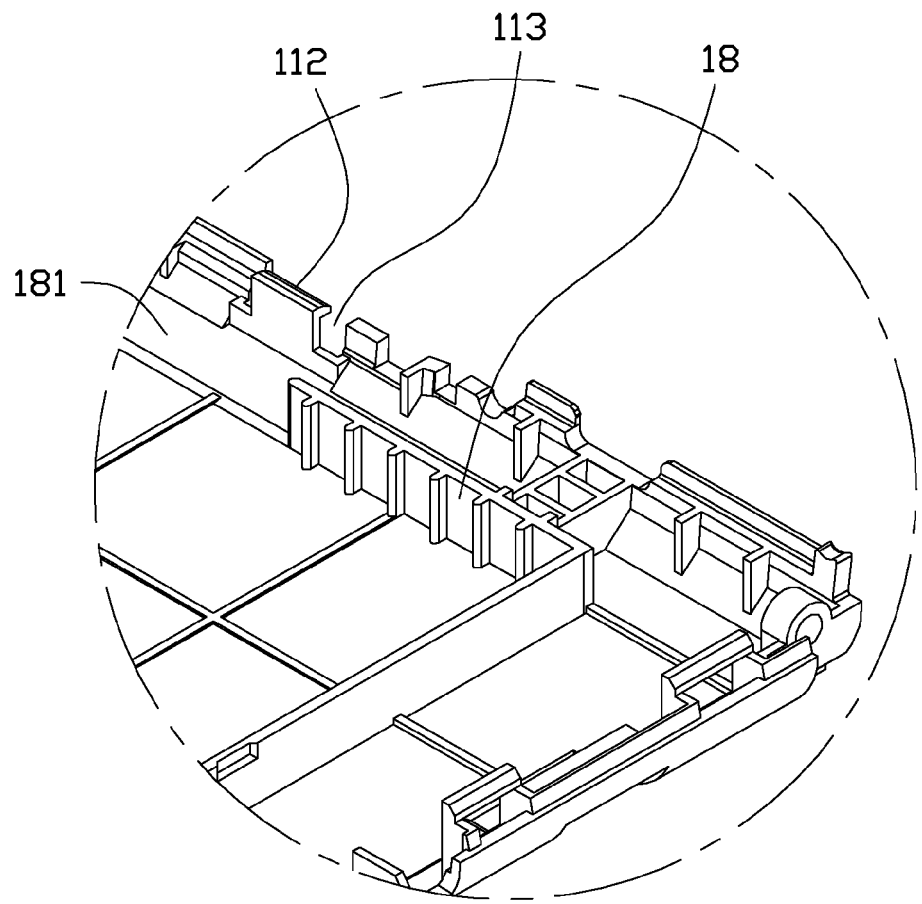
FIG. 3 is an enlarged view of circled portion III of FIG. 2.
Figure 4:
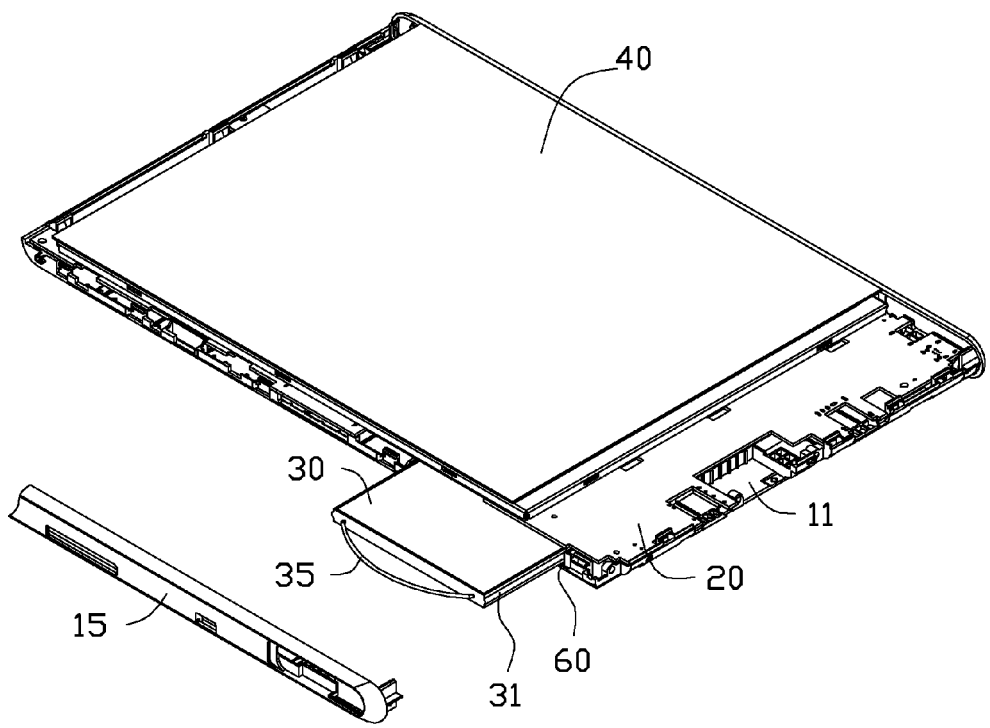
FIG. 4 is a partially assembled view of FIG. 1, with a power supply of the electronic device exposed outside a chassis.
Figure 5:
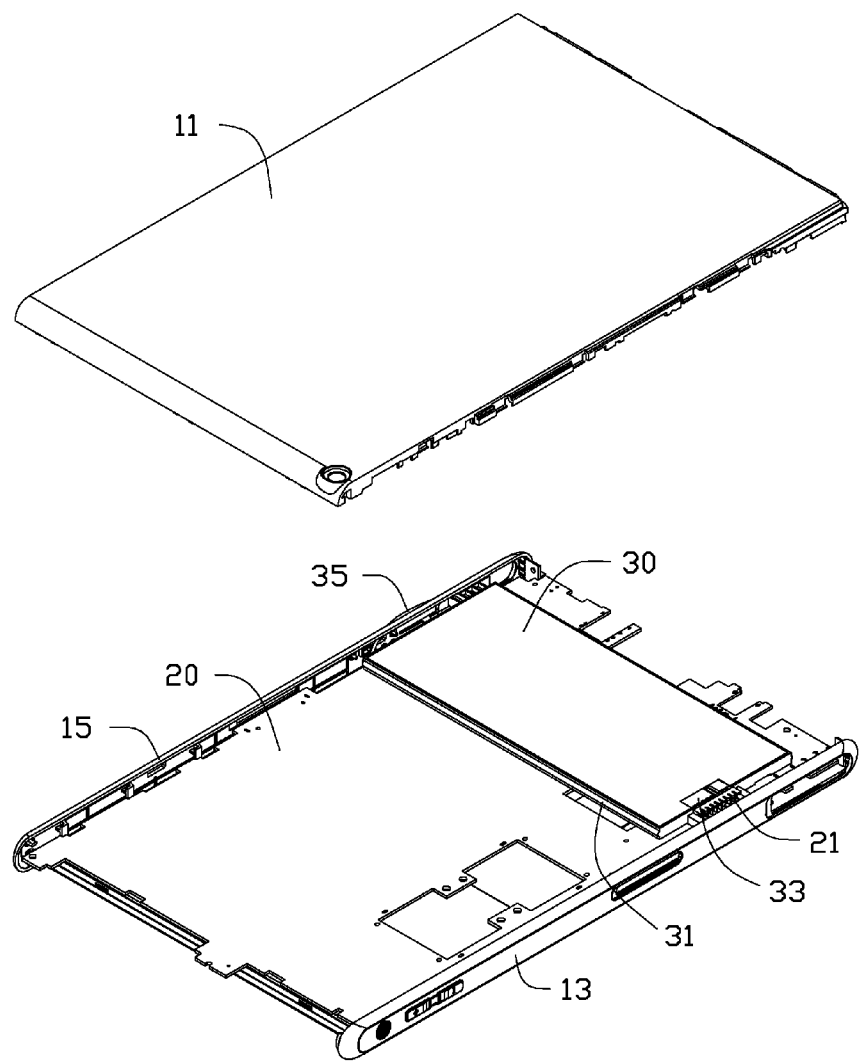
FIG. 5 is similar to FIG. 4, but with the power supply inside the chassis.

Referring to FIGS. 1-3, an electronic device in accordance with an embodiment includes a chassis 10, a circuit board 20 received in the chassis 10, a power supply 30 electronically connected to the circuit board 20, and a display 40 electronically connected to the circuit board 20 and secured to the chassis 10. In one embodiment, the electronic device may be a mobile internet device, such as a tablet computer, or a Personal Digital Assistant.

The chassis 10 includes a base 11, a first side plate 15, and a second side plate 13 opposite to the first side plate 13. In one embodiment, the first side plate 15 has a first annulus 150, and the second side plate 13 has a second annulus 130. A plurality of first positioning blocks 114 extends upwardly from a first side of the base 11, and a plurality of second positioning blocks 112 extends upwardly from a second opposite side of the base 11. A plurality of first sliding slots 115, each adjacent to each first positioning block 114, is defined on the first side of the base 11. A plurality of second sliding slots 113, each adjacent to each second sliding slot 112, is defined on the second side of the base 11.

A first retaining panel 16, a second retaining panel 17, and a third retaining panel 18 located between the first and second retaining panels 16, 17, are connected to an inner surface of the base 11. The third retaining panel 18 is adjacent to the second side plate 13, and a cutout 181 is defined in the third retaining panel 18. In one embodiment, the first retaining panel 16 is substantially parallel to the second retaining panel 17, and substantially perpendicular to the third retaining panel 18. The first, second and third retaining panels 16, 17, 18 cooperatively define an accommodating space 80. An opening which allows entry (entering opening 51) and communicates with the accommodating space 80, is defined in the first side of the base 11. In one embodiment, the distance between the first and second retaining panels 16, 17 is substantially equal to the length of the opening 51, and substantially equal to the width of the power supply 30.

A plurality of first sliding tabs 151 extends from an inner surface of the first side plate 15, and a plurality of second sliding tabs 131 extends from an inner surface of the second side plate 13.

A first connector 21 is attached to a back surface of the circuit board 20. The first connector 21 may be a knife switch connector. In one embodiment, the circuit board 20 has a plurality of electronic devices (not shown), such as a CPU, an expansion card, a memory card, or capacitor, attached to the front surface of the circuit board 20.

The power supply 30 has two sliding portions 31 arranged on opposite sides of the power supply 30. A second connector 33 is attached to a first end of the power supply 30, and an operating member 35 is attached to a second end of the power supply 30. In one embodiment, the second connector 33 may be a knife switch connector, and the operating member 35 may be elastic, such as a cord or a plastic member.

Figure 6:
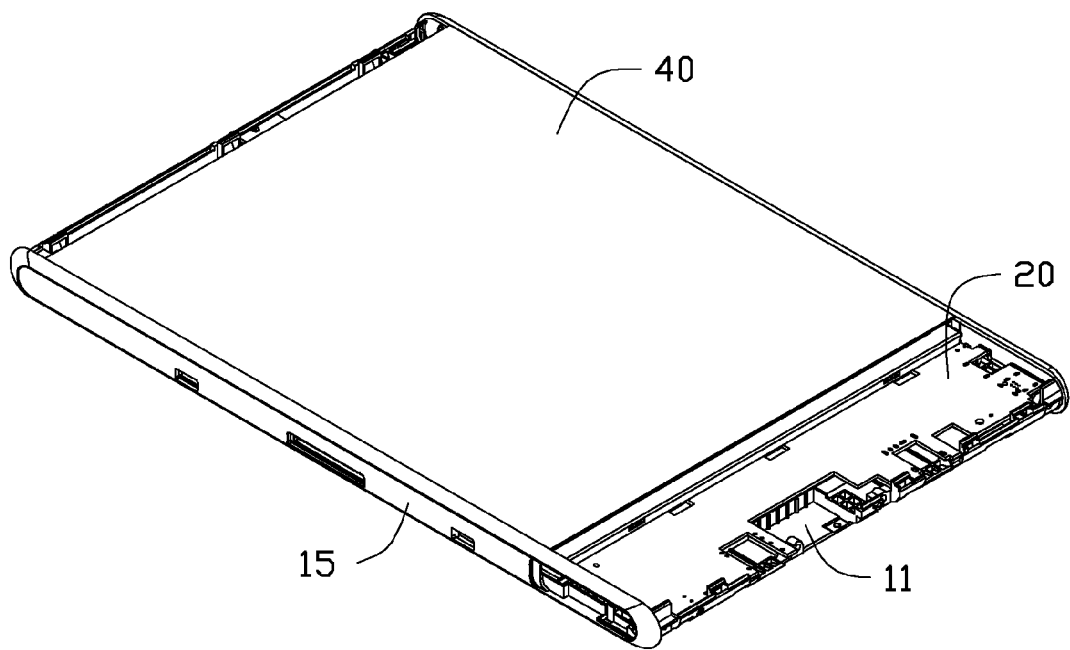
FIG. 6 is similar to FIG. 5, but shown from a different aspect.

Referring to FIG. 6, in assembly, the circuit board 20 is placed on the inner surface of the base 11. A space 60 is thereby defined between the circuit board 20 and the base 11, and the first connector 21 is located in the space 60. The power supply 30 is aligned with the accommodating space 50, and the second connector 33 is pointed toward the opening 51. Then, the power supply 30 is moved in a first direction substantially parallel to the surface of the circuit board 20, and the two sliding portions 31 respectively abut the first and second retaining panels 16, 17, until the second connector 33 passes through the cutout 181 and electronically connects to the first connector 21. Thus, the power supply 30 is received and held in the accommodating space 50.

The first side plate 15 abuts the first side of the base 11 and covers the operating member 35. Each first sliding tab 151 is slid into each first sliding slot 115. The first side plate 15 is moved, and the first sliding tab 151 is slid into the first sliding slot 115, until the first sliding tab 151 abuts the first positioning block 114. The first side plate 15 can then be secured to the base 11 by known techniques, such as screws or adhesive. In one embodiment, the first side plate 15 is substantially perpendicular to the first retaining panel 16.

The second side plate 13 abuts the second side of the base 11, and each second sliding tab 131 is slid into each second sliding slot 113. The second side plate 13 is moved, and the second sliding tab 131 is slid along the second sliding slot 113 until the second sliding tab 131 abuts the second positioning block 112. The second side plate 13 can then be secured to the base 11 by fixing members (not shown), such as screws or adhesive. In this way, the assembly is completed.

When the power supply 30 needs to be detached from the chassis 10, the fixing members are removed from the first side plate 15. The first side plate 15 is then moved and each sliding tab 151 is clear of each sliding slot 115, and the first side plate 15 is thus removed from the base 11, to expose the operating member 35. The user pulls on the operating member 35, to move the power supply 30 in a second direction opposite to the first direction, until the second connector 33 disengages from the first connector 21. The operating member 35 is further pulled until the power supply 30 is pulled clear of the accommodating space 50.

Less sliding friction will be created between the power supply 30 and the first and second retaining panels 16, 17 because the two sliding portions 31 abut the first and second retaining panels 16, 17.

Even though numerous characteristics and advantages have been set forth in the foregoing embodiments, together with details of the structures and functions of the embodiments, the disclosure is illustrative only and changes may be made in detail, especially in matters of shape, size, and the arrangement of parts within the principles of the disclosure to the full extent indicated by the broad general meaning of the terms in which the appended claims are expressed.

What is claimed is:

1. An electronic device comprising: a chassis comprising a base and a first side plate, the base defining an opening; a circuit board attached to the base; a first connector attached to a back surface of the circuit board; a power supply, located between the circuit board and the base and substantially perpendicular to the first side plate; and a second connector attached to the power supply; wherein the second connector of the power supply is configured to slide along a direction substantially parallel to the circuit board to electronically connect to the first direction; in a first position, the second connector is electronically connected to the first connector, and the first side plate is attached to the base to cover the opening; in a second position, the second connector is removed from the first connector, and the first side plate is disengaged from the base to expose the opening; the base comprises a first retaining panel, a second retaining panel, and a third retaining panel located between the first retaining panel and the second retaining panel, the first retaining panel, the second retaining panel, and the third retaining panel cooperatively define the accommodating space, wherein a cutout is defined in the third retaining panel, the cutout being adapted for the second connector to pass through, wherein the power supply comprises two sliding portions, one sliding portion abuts the first retaining panel, and the other one sliding portion abuts the second retaining panel.

2. The electronic device of claim 1, wherein the power supply comprises an operating member located on a first end of the power supply, the second connector is located on a second end of the power supply, and the operating member is configured to be pulled to drive the power supply to slide along a second direction opposite to the first direction, thereby enabling the second connector to disengage from the first connector.

3. The electronic device of claim 2, wherein the operating member is a cord, and the first side plate is configured to cover the operating member after the power supply is received in the accommodating space.

4. The electronic device of claim 1, wherein the first retaining panel is substantially parallel to the second retaining panel and substantially perpendicular to the first side plate.

5. The electronic device of claim 1, wherein the base comprises a sliding slot and a positioning block adjacent to the sliding slot, and the first side plate comprises a sliding tab slidably received in the sliding slot and abuts the positioning block.

6. The electronic device of claim 1, wherein the first connector and the second connector are two knife switch connectors.

7. An electronic device comprising: a chassis comprising a base and a first side plate, the base defining an opening; a circuit board attached to the base; a first connector attached to a back surface of the circuit board; a power supply, located between the circuit board and the base and substantially perpendicular to the first side plate; and a second connector attached to the power supply; wherein the second connector of the power supply is configured to slide along a direction substantially parallel to the circuit board to electronically connect to the first direction; in a first position, the second connector is electronically connected to the first connector, and the first side plate is attached to the base to cover the opening; in a second position, the second connector is removed from the first connector, and the first side plate is disengaged from the base to expose the opening; the base comprises a first retaining panel, a second retaining panel, and a third retaining panel located between the first retaining panel and the second retaining panel, the first retaining panel, the second retaining panel, and the third retaining panel cooperatively define the accommodating space, and in a third position the power supply is received in the accommodating space, wherein a cutout is defined in the third retaining panel, the cutout being adapted for the second connector to pass through, wherein the power supply comprises two sliding portions, one sliding portion abuts the first retaining panel, and the other one sliding portion abuts the second retaining panel, wherein the base comprises a sliding slot and a positioning block adjacent to the sliding slot, the first side plate comprises a sliding tab, and the sliding tab is slidably received in the sliding slot and abuts the positioning block.

8. The electronic device of claim 7, wherein the power supply comprises an operating member, the operating member is located on a first end of the power supply, the second connector is located on a second end of the power supply, and the operating member is configured to be pulled to drive the power supply to slide along a second direction opposite to the first direction, thereby enabling the second connector to disengage from the first connector.

9. The electronic device of claim 8, wherein the operating member is a cord, and the first side plate is configured to cover the operating member after the power supply is received in the accommodating space.

10. The electronic device of claim 7, wherein the first retaining panel is substantially parallel to the second retaining panel and substantially perpendicular to the first side plate.

11. The electronic device of claim 7, wherein the first connector and the second connector are two knife switch connectors.

* * * * *